(12) United States Patent
Valkonen

(10) Patent No.: US 9,109,148 B2
(45) Date of Patent: Aug. 18, 2015

(54) METHOD FOR PRODUCING A BINDER COMPOSITION, A BINDER COMPOSITION, AN ADHESIVE COMPOSITION, A LAYERED COMPOSITE STRUCTURE, AND USES OF THE BINDER COMPOSITION AND THE ADHESIVE COMPOSITION

(75) Inventor: Sanna Valkonen, Augsburg (DE)

(73) Assignee: UPM-Kymmene Corporation, Helsinki (FI)

( * ) Notice: Subject to any disclaimer, the term of this patent is extended or adjusted under 35 U.S.C. 154(b) by 0 days.

(21) Appl. No.: 14/110,303

(22) PCT Filed: Apr. 5, 2012

(86) PCT No.: PCT/FI2012/050345
§ 371 (c)(1),
(2), (4) Date: Oct. 7, 2013

(87) PCT Pub. No.: WO2012/136894
PCT Pub. Date: Oct. 11, 2012

(65) Prior Publication Data
US 2014/0030540 A1    Jan. 30, 2014

(30) Foreign Application Priority Data
Apr. 8, 2011    (FI) ...................................... 20115340

(51) Int. Cl.
| | |
|---|---|
| C08L 61/06 | (2006.01) |
| C09J 197/00 | (2006.01) |
| C08L 97/00 | (2006.01) |
| C09J 161/06 | (2006.01) |
| C08G 8/24 | (2006.01) |
| C08G 8/38 | (2006.01) |
| C09J 161/12 | (2006.01) |
| C08L 61/12 | (2006.01) |
| B32B 7/12 | (2006.01) |

(52) U.S. Cl.
CPC ............... *C09J 197/005* (2013.01); *B32B 7/12* (2013.01); *C08G 8/24* (2013.01); *C08G 8/38* (2013.01); *C08L 61/06* (2013.01); *C08L 61/12* (2013.01); *C08L 97/00* (2013.01); *C08L 97/005* (2013.01); *C09J 161/06* (2013.01); *C09J 161/12* (2013.01); *C09J 197/00* (2013.01); *Y10T 428/31982* (2015.04)

(58) Field of Classification Search
CPC ....... C08L 97/005; C08L 61/06; C08L 97/00; C08L 61/12; C09J 197/00; C09J 197/005; C09J 161/06; C09J 161/12; Y10T 428/31982; C08G 8/24; C08G 8/38; B32B 7/12

USPC ............................ 428/535; 156/328; 524/799
See application file for complete search history.

(56) References Cited

U.S. PATENT DOCUMENTS 4,303,562 A * 12/1981 Hollis et al. .................. 524/735
4,769,434 A    9/1988 Van der Klashorst et al.

FOREIGN PATENT DOCUMENTS

| CA | 2 392 876 A1 | 1/2004 |
|---|---|---|
| CN | 1120572 A | 4/1996 |
| CN | 101402833 A | 4/2009 |
| CN | 101942068 A | 1/2011 |
| DE | 31 23 999 A1 | 1/1983 |
| JP | 2003-041225 A | 2/2003 |
| WO | WO 98/37148 A2 | 8/1998 |
| WO | WO2010/144969 | * 12/2010 |
| WO | WO 2010/144969 A1 | 12/2010 |
| WO | WO 2011/001105 A1 | 1/2011 |

OTHER PUBLICATIONS

Mansouri et al., Holz Als Roh-Und Werkstoff, vol. 69, No. 2, Mar. 26, 2010, pp. 221-229.*
International Search Report for corresponding International Patent Application No. PCT/FI2012/050345 mailed Sep. 4, 2012.
International Preliminary Report on Patentability for corresponding International Patent Application No. PCT/2012/050345 mailed Jul. 3, 2013.
Finnish Search Report for corresponding Finnish Patent Application No. 20115340 mailed Nov. 3, 2011.
Mansouri, H.R. et al. "Synthetic-resin-free wood panel adhesives from mixed low molecular mass lignin and tannin", Eur. J. Wood Prod., vol. 69, No. 2, Mar. 26, 2010, pp. 221-229. English Abstract enclosed.
Chinese Office Action for corresponding Chinese Patent Application No. 201280027678.8 mailed Apr. 17, 2015, English translation.

* cited by examiner

*Primary Examiner* — Leszek Kiliman
(74) *Attorney, Agent, or Firm* — Merchant & Gould P.C.

(57) ABSTRACT

The invention relates to a method for producing a binder composition, wherein the method comprises the following steps: (i) forming an aqueous composition comprising reactant components including lignin, a polymerizable substance and a crosslinking agent in the presence of a catalyst; (ii) cooking the formed composition until the composition has a viscosity, which corresponds to 45-95% of a predetermined viscosity value of the final binder composition; (iii) adding tannin as a reactant component to the composition; and (iv) cooking the composition at a temperature of 60-95° C. for polymerizing the reactant components until a binder composition with a predetermined viscosity value is formed.

25 Claims, 1 Drawing Sheet

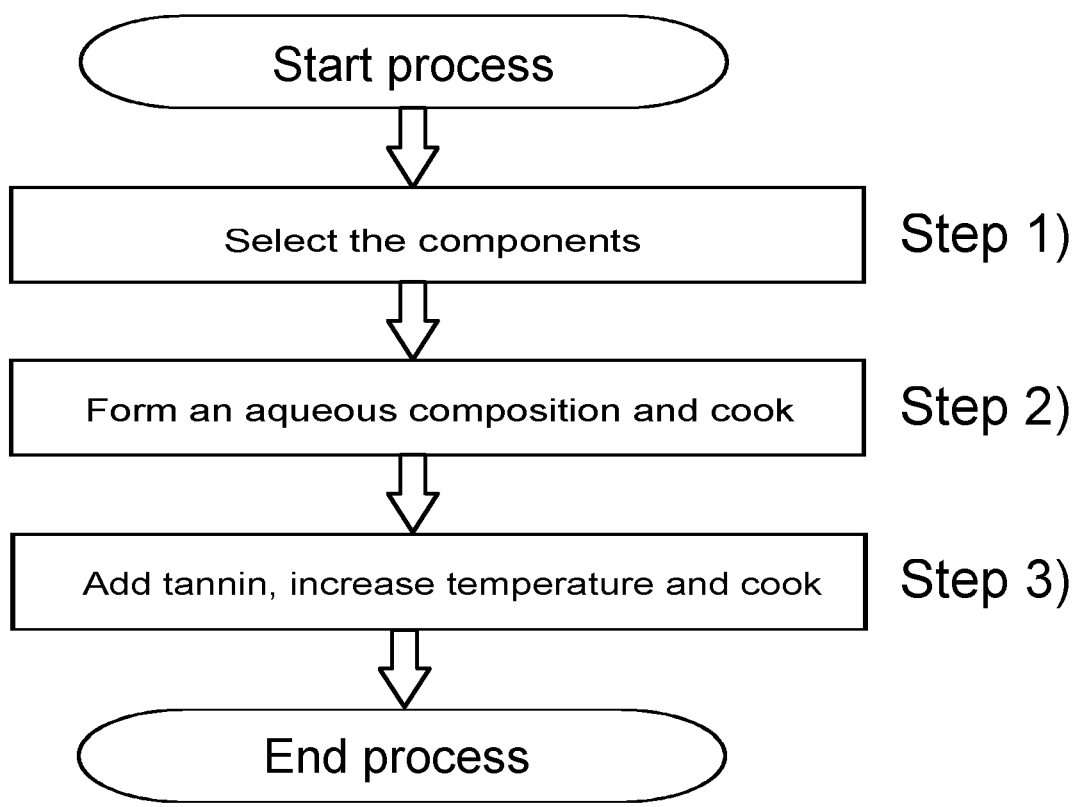

METHOD FOR PRODUCING A BINDER COMPOSITION, A BINDER COMPOSITION, AN ADHESIVE COMPOSITION, A LAYERED COMPOSITE STRUCTURE, AND USES OF THE BINDER COMPOSITION AND THE ADHESIVE COMPOSITION

This application is a National Stage Application of PCT/FI2012/050345, filed 5 Apr. 2012, which claims benefit of Ser. No. 20115340, filed 8 Apr. 2011 in Finland and which applications are incorporated herein by reference. To the extent appropriate, a claim of priority is made to each of the above disclosed applications.

FIELD OF THE INVENTION

The invention relates to a method for producing a binder composition. Further, the invention relates to a binder composition. Further, the invention relates to an adhesive composition, to a layered composite structure and to the uses of the binder composition and the adhesive composition.

BACKGROUND OF THE INVENTION

Tannin and lignin are natural polymers, which can be extracted from e.g. the bark of wood. For example the tannin content of Nordic softwood species, such as pine and spruce, is about 5-20%.

As tannin and lignin are natural biopolymers their use as components in glues instead of synthetic materials has been investigated in order to come up with a more environmentally friendly adhesive composition. Especially, the ability to replace synthetic phenol in final phenolic resins, such as phenol formaldehyde resin, has been the object of prior art.

Prior art discloses different types of adhesive compositions, such a phenolic glues, to be used with wood products. Examples of such glues include compositions comprising phenol formaldehyde resin. Traditionally synthetic phenol formaldehyde resins are produced by polymerizing phenol and formaldehyde in the presence of a catalyst. Examples of such catalysts are sodium hydroxide (NaOH) and acids. The method for producing phenol formaldehyde resin comprises adding formaldehyde in a stepwise manner to a phenol composition and thereafter rising the temperature of the formed composition up to 80-90° C. The composition is cooked at this temperature until a desired viscosity of the formed resin or polymer chain length is reached.

Prior art recognizes the use of lignin for the purpose of decreasing the amount of synthetic phenol in a resin composition. Lignin has previously been used for replacing phenol during the production of lignin-phenol-formaldehyde resin.

Also the use of tannin in adhesive compositions has previously been investigated. However, such production methods disclosed in prior art comprises only physical mixing of the tannin or its derivative into other components such as phenol formaldehyde resin to get a final glue composition.

Drawback of the prior art techniques, and especially of the tannin based production methods, is however that it has only been able to replace up to 30% of the synthetic phenol in the final resin, e.g. phenol formaldehyde resin, with tannin. Higher replacement results in unsatisfying properties of the produced glue.

The inventors have therefore recognized the need for a method, which would result in a higher phenol replacement in the composition and thus in a more environmentally friendly binder composition.

PURPOSE OF THE INVENTION

The purpose of the invention is to provide a new type of method for replacing at least part of the amount of synthetic materials used during the production of a binder composition. Especially the purpose is to produce a more environmentally friendly binder composition to be used e.g. in adhesive applications.

SUMMARY

The method according to the present invention is characterized by what is presented in claim 1.

The binder composition according to the present invention is characterized by what is presented in claim 18.

The adhesive composition according to the present invention is characterized by what is presented in claim 19.

The layered composite structure according to the present invention is characterized by what is presented in claim 20.

The uses according to the present invention are characterized by what is presented in claims 21 and 22.

BRIEF DESCRIPTION OF THE DRAWINGS

The accompanying drawing, which is included to provide a further understanding of the invention and constitutes a part of this specification, illustrates one embodiment of the invention and together with the description helps to explain the principles of the invention. In the drawing:

FIG. 1 is a flow chart illustration of a method according to one embodiment of the present invention.

DETAILED DESCRIPTION OF THE INVENTION

A method according to the present invention for producing a binder composition comprises the following steps:

(i) forming an aqueous composition comprising reactant components including lignin, a polymerizable substance and a crosslinking agent in the presence of a catalyst;

(ii) cooking the formed composition until the composition has a viscosity, which corresponds to 45-95% of a predetermined viscosity value of the final binder composition;

(iii) adding tannin as a reactant component to the composition; and (iv) cooking the composition at a temperature of 60-95° C. for polymerizing said reactant components until a binder composition with a predetermined viscosity value is formed.

In one embodiment of the present invention step (i) of forming the aqueous composition comprises the following steps:

(ia) forming a dispersion comprising lignin; and (ib) adding polymerizable substance and crosslinking agent to the formed dispersion for forming the aqueous composition.

In one embodiment all of the amount of the polymerizable substance, e.g. phenol, used is added at once into the composition. In one embodiment of the present invention the crosslinking agent, e.g. aldehyde, is added in a stepwise manner. Adding the aldehyde in a stepwise manner ensures that the temperature of the composition is not increased too much or too quickly.

In one embodiment of the present invention step (ia) and/or step (ib) comprises adding tannin as a reactant component. Especially if a greater amount of tannin is to be used in the production of the binder composition, then tannin can be added also during step (ia) and/or (ib) in addition to step (iii). In one embodiment of the present invention 30-95 weight-%, preferably 60-95 weight-%, of the total amount of tannin used in the method is added during step (ia) and/or (ib). In one embodiment of the present invention the amount of tannin added during the different method steps is determined based on e.g. the type and/or the properties of the lignin used.

In one embodiment of the present invention step (ib) comprises adding catalyst.

In one embodiment of the present invention step (ia) comprises dissolving lignin in a solvent. In one embodiment of the present invention the solvent comprises sodium hydroxide. In one embodiment of the present invention step (ia) comprises adding water.

The temperature of the dispersion may increase during step (ia) from room temperature up to 65° C.

In one embodiment of the present invention step (i) comprises keeping the composition at a temperature of at most 65° C.

In one embodiment of the present invention step (ii) comprises keeping the temperature of the composition between 20-95° C., preferably between 20-85° C., and more preferably between 20-80° C.

In one embodiment of the present invention step (ii) comprises step (iia), where the temperature is kept between 20-75° C., preferably between 20-70° C., and more preferably between 20-65° C. Step (iia) comprises ensuring that lignin is dissolved. In one embodiment of the present invention step (ii) comprises, after step (iia), step (iib), where the temperature is kept between 30-95° C., preferably between 40-95° C., and more preferably between 45-90° C.

In one embodiment of the present invention the temperature of the composition is decreased below 70° C., preferably below 65° C., and more preferably below 60° C. before step (iii).

In one embodiment of the present invention step (iv) preferably comprises cooking the composition at a temperature of 65-90° C., and more preferably at a temperature of 75-85° C.

In one embodiment of the present invention the temperature of the composition is increased up to 60-95° C., preferably up to 65-90° C., and more preferably up to 75-85° C., before, during or after step (iii).

The temperature can be controlled during the production of the binder composition by cooling and/or heating the composition.

In one embodiment of the present invention the predetermined viscosity value of the final binder composition is at least 40 cP, preferably at least 50 cP, and more preferably at least 80 cP. In one embodiment of the present invention the predetermined viscosity value of the final binder composition is at least 40 but not more than 250 cP, preferably at least 50 cP but not more than 150 cP, and more preferably at least 80 but not more than 120 cP.

In one embodiment of the present invention the predetermined viscosity value of the final binder composition is at least 250 cP, preferably at least 300 cP, and more preferably at least 500 cP. In one embodiment of the present invention the predetermined viscosity value of the final binder composition is at least 250 cP but not more than 1500 cP, preferably at least 300 cP but not more than 1200 cP, and more preferably at least 500 but not more than 1000 cP. The viscosity is measured at 25° C. using a rotary viscometer. The predetermined viscosity value of the final binder composition may vary depending on the specific application where the binder composition is to be used.

In one embodiment of the present invention the weight ratio of lignin and tannin to the polymerizable substance is at least 1.5, preferably at least 2.

In one embodiment of the present invention the amount of tannin is between 1-50%, preferably between 3-35%, and more preferably between 5-25%, of the amount of lignin.

In one embodiment of the present invention the relation between the amounts of lignin, catalyst/solvent, polymerizable substance, crosslinking agent and tannin, based on their dry contents, used for producing the binder composition is the following: 18-60 weight-%, preferably 26-45 weight-%, of crosslinking agent and catalyst/solvent, and 82-40 weight-%, preferably 74-55 weight-%, of the polymerizable substance, lignin and tannin.

In one embodiment of the present invention the crosslinking agent is selected from a group consisting of an aldehyde, a derivative of an aldehyde, an aldehyde forming compound and combinations thereof. In one embodiment of the present invention the derivative of an aldehyde is hexamethylenetetramine, paraformaldehyde or trioxane. In one embodiment of the present invention the crosslinking agent is selected from a group consisting of an aromatic aldehyde, glyoxal, furfuryl alcohol, caprolactam and glycol compounds. The aldehyde can be formaldehyde. The aromatic aldehyde can be furfuryl aldehyde. In one embodiment of the present invention the crosslinking agent is a bio-based crosslinking agent. In one embodiment of the present invention the crosslinking agent is an aldehyde, and preferably formaldehyde.

In one embodiment of the present invention the polymerizable substance is selected from a group consisting of phenol, cresol, resorcinol and combinations thereof. In one embodiment of the present invention the polymerizable substance is phenol. In one embodiment of the present invention the polymerizable substance is selected from a group consisting of biobased hydroxyphenols and their derivatives. In one embodiment of the present invention the polymerizable substance is produced from at least one fatty acid. In one embodiment of the present invention the polymerizable substance is a bio-based polymerizable substance. In one embodiment of the present invention the polymerizable substance is selected from a group consisting of lignin and tannin.

In this specification, unless otherwise stated, the expression "lignin" should be understood as any lignin suitable to be used in the present invention including essentially pure lignin as well as lignin derivatives and lignin modifications. Further, in this specification, unless otherwise stated, the expression "tannin" should be understood as any tannin suitable to be used in the present invention including essentially pure tannin as well as tannin derivatives and tannin modifications.

By the expression "essentially pure lignin" should be understood as at least 90% pure lignin, preferably at least 95% pure lignin. In one embodiment of the present invention the essentially pure lignin comprises at most 10%, preferably at most 5%, of other components. Extractives and carbohydrates such as hemicelluloses can be mentioned as examples of such other components.

By the expression "essentially pure tannin" should be understood as at least 90% pure tannin, preferably at least 95% pure tannin. In one embodiment of the present invention the essentially pure tannin comprises at most 10%, preferably at most 5%, of other components.

In one embodiment of the present invention the lignin is selected from a group consisting of kraft lignin, flash precipitated lignin, biomass originating lignin, lignin from alkaline pulping process, lignin from soda process and combinations thereof.

Different lignin components may have different properties, e.g. molecular weight, molar mass, polydispersity, hemicellulose and extractive contents. In one embodiment of the present invention the lignin includes water but no solvent.

By "kraft lignin" is to be understood in this specification, unless otherwise stated, lignin that originates from kraft black liquor. Black liquor is an alkaline aqueous solution of lignin residues, hemicellulose, and inorganic chemicals used in a kraft pulping process. The black liquor from the pulping process comprises components originating from different softwood and hardwood species in various proportions. Lignin can be separated from the black liquor by different, techniques including e.g. precipitation and filtration. Lignin usually begins precipitating at pH values below 11-12. Different pH values can be used in order to precipitate lignin fractions with different properties. These lignin fractions differ from each other by molecular weight distribution, e.g. Mw and Mn, polydispersity, hemicellulose and extractive contents. The molar mass of lignin precipitated at a higher pH value is higher than the molar mass of lignin precipitated at a lower pH value. Further, the molecular weight distribution of lignin fraction precipitated at a lower pH value is wider than of lignin fraction precipitated at a higher pH value. Thus the properties of the lignin can be varied depending on the end use of the gluing application.

The precipitated lignin can be purified from inorganic impurities, hemicellulose and wood extractives using acidic washing steps. Further purification can be achieved by filtration.

In one embodiment of the present invention the lignin is flash precipitated lignin. The term "flash precipitated lignin" should be understood in this specification as lignin that has been precipitated from black liquor in a continuous process by decreasing the pH of a black liquor flow, under the influence of an over pressure of 200-1000 kPa, down to the precipitation level of lignin using a carbon dioxide based acidifying agent, preferably carbon dioxide, and by suddenly releasing the pressure for precipitating lignin. The method for producing flash precipitated lignin is disclosed in patent application FI 20106073. The residence time in the above method is under 300 s. The flash precipitated lignin particles, having a particle diameter of less than 2 μm, form agglomerates, which can be separated from black liquor using e.g. filtration. The advantage of the flash precipitated lignin is its higher reactivity compared to normal kraft lignin. The flash precipitated lignin can be purified and/or activated if needed for the further processing.

In one embodiment of the present invention the flash precipitated lignin is used in an un-dried, wet form.

In one embodiment, the flash precipitated lignin is undried. Water can be removed from the flash precipitated lignin e.g. by pressing or using air. In one embodiment of the present invention water is removed from the flash precipitated lignin by using pressing and air blowing. In one embodiment of the present invention the temperature of the air blowing is less than or equal to the temperature of the lignin at said process stage. In one embodiment of the present invention the temperature of the air blowing is room temperature. In one embodiment of the present invention the air is fed through the lignin filtrate for less than 1 minute, preferably less than 30 seconds, in order to remove water. The advantage of this kind of lignin is its higher activity and the possibility to re-dissolve the lignin. Further, this kind of undried lignin is easier to handle in further processing as a result of the lignin being less dusty.

In one embodiment of the present invention the dry matter content of the lignin, e.g. the flash precipitated lignin, is below 70%, preferably 40-70%, and more preferably 50-60%.

In one embodiment of the present invention the lignin is separated from pure biomass. The separation process can begin with liquidizing the biomass with strong alkali followed by a neutralization process. After the alkali treatment the lignin can be precipitated in a similar manner as presented above. In one embodiment of the present invention the separation of lignin from biomass comprises a step of enzyme treatment. The enzyme treatment modifies the lignin to be extracted from biomass. Lignin separated from pure biomass is sulphur-free and thus valuable in further processing.

In one embodiment of the present invention the tannin used originates from any wood species. Tannin may originate from e.g. bark or heartwood. Quebracho tree, beech tree and wattle tree are presented as examples of possible sources of tannin.

In one embodiment of the present invention the tannin used originates from softwood bark. In one embodiment of the present invention the tannin is separated from softwood bark of debarking units in sawmills or pulp mills. The separation process can be combined with an ethanol extraction process, a hot water extraction process, a hot steam extraction process or a water-ethanol extraction process of softwood bark.

In one embodiment of the present invention the tannin is condensed tannin. Condensed tannin has a high dry content and is therefore suitable to be used in the present invention. The dry matter content of condensed tannin may vary between 40-100% and is suitably between 60-90% and preferably between 70-80%. Tannin with such dry matter content can easily be dispersed, whereby a good reactivity with the other reactant components is achieved. The tannin may also be hydrolysable tannin.

In one embodiment of the present invention the method comprises dispersing tannin before adding it to the composition. If the amount of tannin to be used in the production of the binder composition is more than 3%, preferably more than 5%, more preferably more than 8% of the total dry matter content of the components to be used for the production of the binder composition, then tannin is dispersed before it is added to the composition. The lignin and/or tannin polymers can be de-polymerized for reducing the molecular weight of the polymer in order to form low molecular weight oligomers. The activity and reactivity may simultaneously be increased.

The method of the present invention surprisingly results in a more environmentally friendly binder composition since in the method the natural polymers lignin and tannin, both of which are phenolic polymers, have replaced at least part of the synthetic phenol substance usually used in the production of phenolic compositions such as phenol formaldehyde resin. Without limiting the invention to any specific theory about why the method of the present inventions results in the aforementioned advantage, it is to be considered that the suitability of replacing at least part of e.g. the phenol with lignin and tannin is due to the fact that both lignin and tannin react with an aldehyde, such as formaldehyde, in a quite similar manner as phenol. The use of tannin as a reactive additive in the method of the present invention boosts the gluing properties of this kind of lignin based phenolic composition.

In one embodiment of the present invention the catalyst comprises a salt or a hydroxide of an alkali metal. In one embodiment of the present invention the catalyst is selected from a group consisting of sodium hydroxide, potassium hydroxide, acids and their combinations. In one embodiment of the present invention the catalyst is sodium hydroxide.

The precise order of combining and/or adding the components needed for the binder composition production may vary depending e.g. on the required properties of the formed binder composition. The choice of the sequence of combining and/or adding the required components is within the knowledge of the skilled person based on this specification. The precise amount of the components used for producing the binder composition may vary and the choice of the amounts of the different components is within the knowledge of the skilled person based on this specification.

When determining the order of mixing and combining together the components to be used in the production of the binder composition, it should be taken into consideration that tannin is a more reactive component than lignin. Therefore, lignin may preferably be cooked in the aqueous composition for a longer period of time than tannin. In this way it is ensured that lignin has sufficiently time to react with the crosslinking agent, e.g. the aldehyde. Further, it should be noted that cooking tannin for a long period of time may increase the viscosity of the composition to an unsuitable extent.

The present invention further relates to a binder composition obtainable by the method according to the present invention.

The present invention further relates to an adhesive composition comprising the binder composition according to the present invention. The adhesive composition can further comprise one or more adhesive components selected from a group consisting of other binders, extenders, additives, catalysts and fillers. A binder is a substance, which is mainly responsible for creating the growing and cross-linking of polymer and thus assists in the curing of polymer systems. An extender is a substance, which assists the binder by adjusting physical properties for example by binding moisture. The additive can be a polymer or an inorganic compound, which assists in properties like filling, softening, reducing costs, adjusting moisture, increasing stiffness and increasing flexibility. The catalyst is a substance, which usually boosts and adjusts the curing speed. By "substance" is herein to be understood as including a compound or a composition. The binder composition of the present invention may serve as a binder, an extender, an additive, a catalyst and/or a filler in the adhesive composition.

The present invention further relates to a layered composite structure formed of two or more layers including at least one wood veneer layer, wherein the layers are arranged the one above the other and combined by means of gluing with the binder composition according to the present invention and/or the adhesive composition according to the present invention. In this specification, unless otherwise stated, the term "wood veneer" is used to address a veneer, which can be formed of any material, e.g. wood-based material, fiber material, composite material or the like. In this context, the thickness of the wood veneer can be varied. Typically the thickness of wood veneer is below 3 mm.

In one embodiment of the present invention the layered composite structure is selected from a group consisting of a wood panel product, a plywood product, a composite product, and a pressed panel product. The layered composite structure can be formed of a number of layers, preferably wood veneer layers, in which the layers are laid one upon the other and glued together.

The present invention further relates to the use of the binder composition in an impregnation application, as a coating, for strengthening plastic, for producing a compressed casting, a laminate or a lacquer, or for gluing a wood product. The binder composition of the present invention can further be used for gluing combinations of plastic and wood.

The present invention further relates to the use of the adhesive composition for gluing a wood product.

In one embodiment of the present invention the wood product is selected from a group consisting of a wood board, a wood veneer, and a wood bar.

The embodiments of the invention described hereinbefore may be used in any combination with each other. Several of the embodiments may be combined together to form a further embodiment of the invention. A method, a composition or a use, to which the invention is related, may comprise at least one of the embodiments of the invention described hereinbefore.

An advantage of the method according to the present invention is that by using lignin and tannin together as reactant components during the production of a binder composition a more environmentally friendly binder composition is achieved. Surprisingly it has been found out that when using both lignin and tannin as reactant components the amount of the polymerizable substance, such as the synthetic phenol substance, e.g. phenol, can be markedly decreased during the binder production process. As the phenol being a synthetic compound and lignin and tannin being natural polymers, it is advantageous to be able to minimize the amount of phenol present in the final binder composition.

An advantage of the present invention is that by using tannin as a reactive additive, i.e. in a lesser amount than lignin, in the method for producing the binder composition it is possible to modify the properties of the final binder composition such that the composition is more favorable for gluing. Properties such as curing, drying, shear strength and penetration can be made more suitable for gluing applications with the present invention.

An advantage is especially achieved when using flash precipitated lignin, preferably in its undried form, which has higher reactivity than normal kraft lignin thus resulting in even better compatibility and reaction behavior of the method according to the present invention.

An advantage of using tannin together with lignin for the production of the binder composition according to the present invention is e.g. that tannin enhances the tensile strength and ductility of the produced binder composition.

An advantage of the present invention is that a higher level of bio-based components is achieved in the final binder composition. This advantage can be achieved when using the specific process steps of the present invention and especially when tannin is added to the composition at a later process stage than lignin.

EXAMPLES

Reference will now be made in detail to the embodiments of the present invention, an example of which is illustrated in the accompanying drawing.

The description below discloses some embodiments of the invention in such a detail that a person skilled in the art is able to utilize the invention based on the disclosure. Not all steps of the embodiments are discussed in detail, as many of the steps will be obvious for the person skilled in the art based on this specification.

FIG. 1 illustrates a method according to one embodiment of the present invention for producing a binder composition.

Before forming an aqueous composition including some of the reactant components, the source of especially lignin and tannin, is chosen in order to prepare a binder composition with desired properties. As presented above, lignin can be selected from kraft lignin, flash precipitated lignin, biomass originating lignin, lignin from alkaline pulping process, lignin from soda process and combinations thereof. Also the other components and their amounts to be used in the method according to the present invention are selected. The reactant components are also pretreated if needed in order to e.g. activate and/or modify the components.

Following step 1) of various preparations and pretreatments, in the embodiment of the present invention shown in FIG. 1, step 2) is carried out. Step 2) comprises forming an aqueous composition including combining some of the required components, i.e. lignin, the polymerizable substance, the crosslinking agent and the catalyst, in a predetermined order with simultaneously controlling the temperature of the formed composition. The selected components can be added to step 2) of forming the composition one after the other or at least partly simultaneously. After mixing these components the composition is cooked until the viscosity of the composition is 45-95% of a predetermined viscosity value of the final binder composition. The composition can be cooked at a temperature of 20-95° C.

Then step 3) is carried out. Step 3) comprises adding tannin into the composition after which the temperature of the formed aqueous composition is increased to 80-90° C. The composition is cooked at this temperature until a predetermined viscosity of the composition is reached or until a desired polymerizing length is achieved.

In another embodiment of the present invention, the temperature of the composition can be increased to 80-90° C. already before the tannin is added or the temperature can be increased to 80-90° C. simultaneously with the addition of tannin.

As a result of step 1), step 2) and step 3) a binder composition having desired properties is produced. This binder composition can be used as such for gluing applications or it can be further processed with other adhesive components for producing an adhesive composition.

Example 1

Preparing a binder composition

In this example a lignin-tannin-phenol formaldehyde binder composition was produced according to the embodiment of the present invention shown in FIG. 1.

The following components and their amounts were used:

| | |
|---|---|
| water | 300 g |
| NaOH (first part (dispersion)) 50% | 250 g |
| kraft lignin 98% | 400 g |
| tannin 90% | 150 g |
| phenol 90% | 250 g |
| formaldehyde 38% | 1000 g |
| NaOH (second part (catalyst)) 50% | 100 g. |

The percentage of the components (based on dry contents) used in this example was the following:

| | |
|---|---|
| NaOH | about 13% |
| kraft lignin | about 30% |
| tannin | about 10% |
| phenol | about 17% |
| formaldehyde | about 30%. |

Firstly, water, the first part of NaOH and lignin were mixed such that dispersion was formed. Simultaneously the temperature increased from room temperature to about 65° C. Then all of the phenol was added followed by adding the formaldehyde in a stepwise manner for forming an aqueous composition. The temperature was kept under 65° C. After adding also the second part of the NaOH to the composition, the composition was cooked until the viscosity of the composition corresponded to 45-95% of the viscosity of the final binder composition. Then the tannin was added and the temperature was increased to about 80-90° C. The cooking was continued at this temperature until the viscosity of the formed composition was about 500 cp (as measured at a temperature of 25° C.).

In this example tannin was added to the composition only after the lignin had been added and cooked with other components for a predetermined time in order to ensure that lignin being less reactive had sufficiently time to react with phenol and formaldehyde before the more reactive tannin was added.

However, part of the tannin could also had been added e.g. simultaneously with lignin however taking into consideration that if tannin is cooked for a long time the viscosity of the formed resin may become too high. The manner of adding tannin to the composition depends e.g. on the total amount of tannin to be used.

Example 2

Preparing a Binder Composition

In this example a lignin-tannin-phenol glyoxal binder composition was produced.

The following components and their amounts were used:

| | |
|---|---|
| water | 370 g |
| NaOH (first part (dispersion)) 50% | 300 g |
| kraft lignin 75% | 530 g |
| tannin 90% | 100 g |
| phenol 90% | 540 g |
| glyoxal 40% | 1100 g |
| NaOH (second part (catalyst)) 50% | 150 g |

Firstly, water, the first part of NaOH and lignin were mixed such that dispersion was formed.

Simultaneously the temperature increased from room temperature to about 50° C. Then all of the phenol was added followed by adding the glyoxal in a stepwise manner for forming an aqueous composition. The temperature was kept under 65° C. ¾ of the total amount of tannin was added to the above formed aqueous composition when at least half of the amount of glyoxal, preferably all of the amount of glyoxal, had been added to the composition. After adding also the second part of the NaOH to the composition, the composition was cooked until the viscosity of the composition corresponded to 40-95% of the viscosity of the final binder composition. Then the rest of the tannin was added and the temperature was increased to about 75-80° C. The cooking was continued at this temperature until the viscosity of the formed composition was about 300 cp (as measured at a temperature of 25° C.).

Example 3

Preparing a Binder Composition

In this example a lignin-tannin-resorcinol formaldehyde binder composition was produced.

The following components and their amounts were used:

| | |
|---|---|
| water | 340 g |
| NaOH (first part (dispersion)) 50% | 240 g |
| kraft lignin 75% | 494 g |
| tannin 90% | 21 g |
| resorcinol 90% | 450 g |
| formaldehyde 40% | 800 g |
| NaOH (second part (catalyst)) 50% | 115 g |

Firstly, water, the first part of NaOH and lignin were mixed such that dispersion was formed. Simultaneously the temperature increased from room temperature to about 50° C.

Then half of the resorcinol was added followed by formaldehyde in a stepwise manner for forming an aqueous composition. The temperature was kept under 65° C. Rest of the resorcinol was added to the above formed aqueous composition when at least half of the amount of formaldehyde, preferably all of the formaldehyde, had been added to the composition. After adding also the second part of the NaOH to the composition, the composition was cooked until the viscosity of the composition corresponded to 40-95% of the viscosity of the final binder composition. Then the tannin was added and the temperature was increased to about 70-75° C. The cooking was continued at this temperature until the viscosity of the formed composition was about 300 cp (as measured at a temperature of 25° C.).

Example 4

Preparing an Adhesive Composition

In this example the lignin-tannin-phenol formaldehyde binder composition produced in Example 1 was used for the production of an adhesive composition. The binder composition was mixed with extenders, fillers, catalysts, additives, as examples of which e.g. starch, wood flour and hardener (e.g. tannin or carbonates) can be mentioned, thus forming the adhesive composition.

Example 5

Applying the Binder Composition for Producing a Plywood Product

Wood veneers having the thickness of below 3 mm were glued together with the lignin-tannin-phenol formaldehyde binder composition produced in Example 1 for producing a 7-plywood. Results showed that the gluing effect was sufficiently good for gluing wood veneers.

Example 6

Applying the Adhesive Composition for Producing a Plywood Product

In this example the adhesive composition of Example 4 was applied onto wood veneers. The wood veneers were joined together by the adhesive composition for forming a plywood. The dry matter content of the adhesive composition was between 45 and 55%. The wood veneers with the adhesive composition were pressed by hot-pressing technique at a temperature between 120-170° C. The adhesive composition was simultaneously cured. The adhesive composition of the present invention was found suitable for gluing wood veneers together and thus for manufacturing plywood.

Example 7

Applying the Binder Composition for Producing Laminates

In this example the lignin-tannin-phenol formaldehyde binder composition as produced in Example 1 was used in an impregnation application. During the production of laminates paper was impregnated with an alcohol solution of the binder composition, after which the impregnated layers were transferred into a furnace. The alcohol was volatilized and the binder composition was partly cured. The layers comprising such semi-cured composition were arranged the one above the other and baked by a hot-pressing technique in order to form uniform thicker boards or laminates.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method for producing a binder composition, wherein the method comprises the following steps:
   (i) forming an aqueous composition comprising reactant components including: lignin; a polymerizable substance; and a crosslinking agent in the presence of a catalyst;
   (ii) cooking the formed composition until the composition has a viscosity, which corresponds to 45-95% of a predetermined viscosity value of the final binder composition;
   (iii) adding tannin as a reactant component to the composition; and
   (iv) cooking the composition at a temperature of 60-95° C. for polymerizing the reactant components of steps (i) and (iii) until a binder composition with a predetermined viscosity value is formed.

2. The method of claim 1, wherein step (i) of forming the aqueous composition comprises the following steps:
   (ia) forming a dispersion comprising lignin; and
   (ib) adding polymerizable substance and crosslinking agent to the dispersion for forming the aqueous composition.

3. The method of claim 2, wherein step (ia) and/or step (ib) comprises adding tannin as a reactant component.

4. The method of claim 2, wherein step (ib) comprises adding catalyst.

5. The method of claim 1, wherein step (i) comprises keeping the composition at a temperature of at most 65° C.

6. The method of claim 1, wherein step (ii) comprises keeping the temperature of the composition between 20-95° C.

7. The method of claim 1, wherein the temperature of the composition is decreased below 70° C. before step (iii).

8. The method of claim 1, wherein step (iv) comprises cooking the composition at a temperature of 65-90° C.

9. The method of claim 1, wherein the temperature of the composition is increased up to 60-95° C. before, during or after step (iii).

10. The method of claim 1, wherein the weight ratio of lignin and tannin to the polymerizable substance is at least 1.5.

11. The method of claim 1, wherein the amount of tannin is between 1-50% of the amount of lignin.

12. The method of claim 1, wherein the crosslinking agent is an aldehyde.

13. The method of claim 1, wherein the polymerizable substance is selected from a group consisting of phenol, cresol, resorcinol and combinations thereof.

14. The method of claim 1, wherein the lignin is selected from a group consisting of kraft lignin, flash precipitated lignin, biomass originating lignin, lignin from alkaline pulping process, lignin from soda process and combinations thereof.

15. The method of claim 1, wherein the tannin is condensed tannin.

16. The method of claim 1, wherein the method comprises dispersing tannin before adding it to the composition.

17. The method of claim 1, wherein the catalyst is sodium hydroxide.

18. A binder composition obtainable by the method of claim 1.

19. An adhesive composition comprising the binder composition of claim 18.

20. A layered composite structure formed of two or more layers including at least one wood veneer layer, wherein the layers are arranged the one above the other and combined by means of gluing with the binder composition of claim 18.

21. A method of preparing a product, the method comprising applying the binder composition of claim 18 to a substrate, wherein applying the binder composition results in impregnation of the composition in the substrate, in coating the substrate, in strengthening a plastic substrate, in a compressed casting, in a laminate or a lacquer, or in gluing of a wood substrate.

22. A method of gluing a wood product comprising applying the adhesive composition of claim 19 to a wood substrate.

23. The method of claim 10, wherein the weight ratio of lignin and tannin to the polymerizable substance is at least 2.

24. The method of claim 11, wherein the amount of tannin is between 3-35% of the amount of lignin.

25. The method of claim 11, wherein the amount of tannin is between 5-25% of the amount of lignin.

\* \* \* \* \*